US012608845B2

(12) United States Patent
Kookna et al.

(10) Patent No.: US 12,608,845 B2
(45) Date of Patent: Apr. 21, 2026

(54) CAMERA HEALTH MONITORING AND ALERTING SYSTEM

(71) Applicant: GENERAL ELECTRIC COMPANY, Schenectady, NY (US)

(72) Inventors: Vikas Kookna, Rajasthan (IN); Dheeraj Sharan Singh, Karnataka (IN)

(73) Assignee: GE VERNOVA ELECTRIFICATION SOFTWARE HOLDINGS LLC, Cambridge, MA (US)

( * ) Notice: Subject to any disclaimer, the term of this patent is extended or adjusted under 35 U.S.C. 154(b) by 472 days.

(21) Appl. No.: 18/127,100

(22) Filed: Mar. 28, 2023

(65) Prior Publication Data

US 2024/0331198 A1 Oct. 3, 2024

(51) Int. Cl.
*G06T 7/80* (2017.01)
*H04N 13/00* (2018.01)

(52) U.S. Cl.
CPC .............. *G06T 7/85* (2017.01); *H04N 13/00* (2013.01); *G06T 2207/10012* (2013.01); *H04N 2013/0074* (2013.01)

(58) Field of Classification Search
CPC ... G06T 7/85; G06T 2207/10012; G06T 7/80; G06T 5/50; G06T 7/0002; H04N 13/00; H04N 2013/0074; H04N 23/64; G06V 20/52; G06V 2201/06
See application file for complete search history.

(56) References Cited

U.S. PATENT DOCUMENTS

| 7,683,934 B2 * | 3/2010 | Montminy ............. G08B 29/26 |
| | | 348/207.99 |
| 8,964,030 B2 | 2/2015 | Itoh et al. |
| 9,984,466 B1 * | 5/2018 | Duran .................... H04N 7/188 |
| 10,579,906 B1 * | 3/2020 | Mishra ............... G06V 30/1916 |
| 2007/0126869 A1 | 6/2007 | Montminy et al. |

(Continued)

OTHER PUBLICATIONS

Y.-C. Zeng, M.-F. Chueh and C.-H. Tsai, "Automatic recognition of frame quality degradation for inspection of surveillance camera," Proceedings of The 2012 Asia Pacific Signal and Information Processing Association Annual Summit and Conference, Hollywood , CA, USA, 2012, pp. 1-8. (Year: 2012).*

*Primary Examiner* — Utpal D Shah
*Assistant Examiner* — Jack Peter Kraynak
(74) *Attorney, Agent, or Firm* — Buckley, Maschoff & Talwalkar LLC

(57) ABSTRACT
Provided is a system and method that can simultaneously check if a camera is subjected to lack of focus (e.g., blur), movement, obstruction, improper zoom, improper pan, or the like, using a single reference image. The system does not require deep learning or training thus keeping the system lightweight. In one example, the method may include receiving an image of a scene captured by a camera, applying a filter to the image corresponding to an image attribute of the camera to generate filtered image and applying the filter to a reference image of the scene to generate a filtered reference image, respectively, determining that a quality of the image attribute of the camera has degraded based on a comparison of the filtered image to the filtered reference image, and displaying an alert on a user interface with information about the degradation of the quality of the image attribute.

18 Claims, 7 Drawing Sheets

(56)                    References Cited

U.S. PATENT DOCUMENTS

| | | | |
|---|---|---|---|
| 2007/0247526 A1* | 10/2007 | Flook ................. | G08B 13/1961 |
| | | | 348/161 |
| 2012/0026326 A1* | 2/2012 | Itoh ........................ | G06V 10/30 |
| | | | 348/143 |
| 2018/0082416 A1* | 3/2018 | Arulesan .............. | H04N 23/611 |
| 2020/0167900 A1* | 5/2020 | Derndinger ............... | G06T 5/20 |
| 2021/0116864 A1* | 4/2021 | Hornstein ............ | H04N 17/002 |
| 2021/0176411 A1* | 6/2021 | Winzell ................. | H04N 23/23 |
| 2022/0245792 A1* | 8/2022 | Gao ...................... | G06T 7/0008 |
| 2022/0408022 A1* | 12/2022 | Maruhashi ............. | H04N 23/90 |
| 2023/0054572 A1* | 2/2023 | Shandilya .............. | H04N 23/64 |

* cited by examiner

Plant Floor
100

Figure 2B:
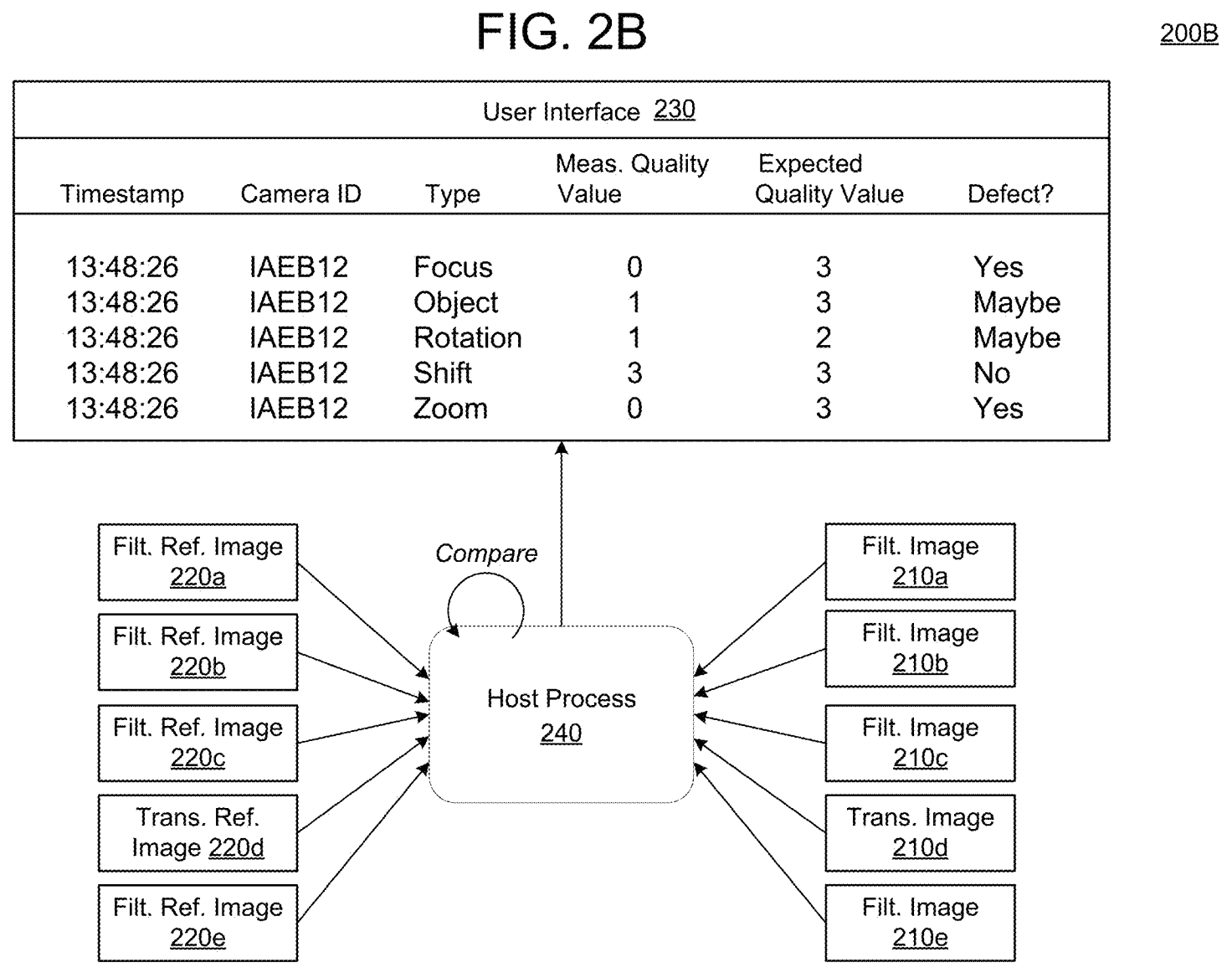

User Interface 230

| Timestamp | Camera ID | Type | Meas. Quality Value | Expected Quality Value | Defect? |
|-----------|-----------|------|---------------------|------------------------|---------|
| 13:48:26 | IAEB12 | Focus | 0 | 3 | Yes |
| 13:48:26 | IAEB12 | Object | 1 | 3 | Maybe |
| 13:48:26 | IAEB12 | Rotation | 1 | 2 | Maybe |
| 13:48:26 | IAEB12 | Shift | 3 | 3 | No |
| 13:48:26 | IAEB12 | Zoom | 0 | 3 | Yes |

Filt. Image 210a

Filt. Image 210b

Filt. Image 210c

Trans. Image 210d

Filt. Image 210e

Host Process 240

Compare

Filt. Ref. Image 220a

Filt. Ref. Image 220b

Filt. Ref. Image 220c

Trans. Ref. Image 220d

Filt. Ref. Image 220e

CAMERA HEALTH MONITORING AND ALERTING SYSTEM

BACKGROUND

Cameras can be used to capture images and video of equipment, structures, buildings, assets, and the like, including industrial assets in the fields of transportation, manufacturing, oil and gas, power generation, etc. In many cases, the cameras are disposed in areas that are subject to heavy wear and tear and which can experience high temperatures, objects and other debris in the way, dust, rain, wind, and other elements. Each of these factors can affect the quality of the images captured by the camera. In some cases, the camera may be moved, turned, obstructed, have its field of view changed, or the like, which can affect the performance of the camera. When a camera is no longer working properly, it is typically up to a person (operator, etc.) to visually inspect the camera and the area surrounding the camera for an issues. Accessing such an area can be difficult, especially in industrial environments where cameras are often placed in hard to reach places such as ceilings, roofs, fences, on top of poles, and the like.

SUMMARY

The example embodiments improve upon the prior art by providing a health monitoring system for monitoring the health of a camera based on images captured by the camera and one or more spatial filters. The system can use a single image captured by the camera to analyze multiple different image quality attributes such as lack of focus, object obstruction, improper zoom, improper pan, movement of the field of view, and the like. Rather than use machine learning or another type of process that requires training a model, the example embodiments can apply spatial filters that are defined in advance and that do not require training. The system is light weight enough that it can be integrated into the camera itself or hosted by a remote computing platform such as a web server, cloud platform, on-premises server, or the like. Furthermore, multiple quality attributes of a camera can be observed using only one image from the camera and one reference image.

According to an example embodiment, a computing system may include a memory that may store an image of a scene captured by a camera, and a processor that may apply a filter to the image corresponding to an image attribute of the camera to generate filtered image and apply the filter to a reference image of the scene to generate a filtered reference image, respectively, determine that a quality of the image attribute of the camera has degraded based on a comparison of the filtered image to the filtered reference image, and display an alert on a user interface with information about the degradation of the quality of the image attribute.

According to an aspect of another example embodiment, a method may include receiving an image of a scene captured by a camera, applying a filter to the image corresponding to an image attribute of the camera to generate filtered image and applying the filter to a reference image of the scene to generate a filtered reference image, respectively, determining that a quality of the image attribute of the camera has degraded based on a comparison of the filtered image to the filtered reference image, and displaying an alert on a user interface with information about the degradation of the quality of the image attribute.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2B are diagrams illustrating a process of filtering images and comparing them to filtered reference images to identify quality values of a camera in accordance with an example embodiment.

Figure 1A:
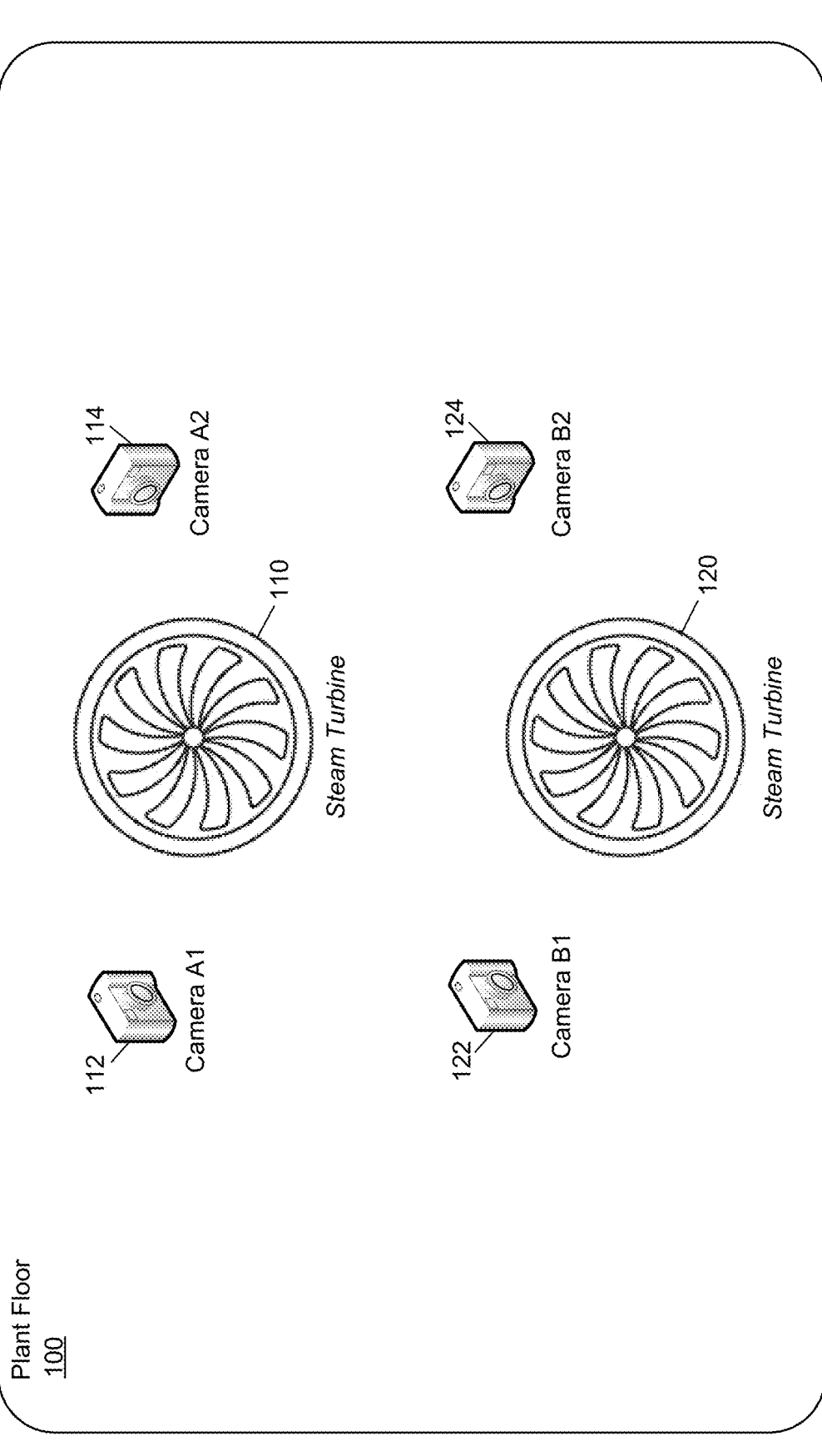
FIG. 1A is a diagram illustrating a plant floor with cameras for monitoring industrial assets in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Cameras are often disposed within environments that are subject to wear and tear such as a floor of an industrial plant. In such environments, the cameras are subject to heavy wear and tear including rain, wind, dust, high temperatures, and the like, which can affect the performance of the cameras. Furthermore, accessing such cameras for a manual/visual inspection can be difficult due to the location and the environment where the camera is located. Cameras are often placed in hard-to-reach locations such as those in the ceiling, on top of fencing, roofs, etc.

The example embodiments are directed to a system that can monitoring the health of a camera (e.g., a video camera, a digital camera, a camera within a smartphone, and the like) which include an imaging element such as a megapixel camera for capturing images. The health monitoring system may be embedded within the camera itself. As another example, the system may be connected or otherwise coupled to the camera via a network and receive images from the camera via the network. The health monitoring system can capture or otherwise store a reference image of the environment of the camera. The reference image can be an image of what the scene should look like (e.g., a default image of the scene in good quality). When a new image is captured by the camera, the health monitoring system can compare the new image to the reference image to determine if the camera is suffering from any quality issues or if the camera is working properly.

As an example, the system may apply one or more spatial filters corresponding to one or more image quality attributes to both an image received from the camera and a reference image previously stored for the camera, and compare the filtered image to the filtered reference image to determine if one or more image quality attributes (e.g., focus, zoom, object obstruction, shift, etc.) are not properly aligned based on the reference image. If the system detects deterioration, an alert or other warning can be issued to the camera and/or to a remote computer system associated with the camera.

Some of the benefits of the example embodiments is the light-weight aspect of the system enabling it to be integrated into existing infrastructure. The system does not rely on machine learning/deep learning models and therefore does not need to be trained. Instead, the system can use image filters and other transformations such as Fourier transforms on the image and the reference image to simultaneously compare multiple quality attributes of the camera using only one image and one reference image. This is a lightweight solution that can be integrated into existing cameras and into existing network infrastructure such as servers, asset controllers, and the like. Furthermore, the system can be of significant benefit for cameras that are located in industrial environments (hard to reach places). This invention relieves a person from having to manually inspect the camera for any problems which can save a significant amount of time and relieve the user from possible injury while trying to access the camera. Furthermore, any problems detected can be notified immediately through the alerting system described herein.

FIG. 1A illustrates a plant floor 100 with cameras for monitoring industrial assets 110 and 120 in accordance with an example embodiment. In the example of FIG. 1A, the industrial assets 120 are steam turbines 110 and 120. Here, a camera 112 and a camera 114 are disposed within the plant floor 100 around a location of the steam turbine 110 and can capture images of the steam turbine 110. Likewise, a camera 122 and a camera 124 are disposed within the plant floor 100 around a location of the steam turbine 120 and can capture images of the steam turbine 120. The cameras 112, 114, 122, and 124 can capture images of the surface of the steam engines 110 and 120 to help identify cracks, rust, moisture, humidity, damage, objects obstructing the field of view, and the like.

While the example of FIG. 1A is shown in an industrial environment (i.e., the plant floor 100) it should be appreciated that the example embodiments can apply to cameras that are installed anywhere and not just for use with industrial operations.

Figure 1B:
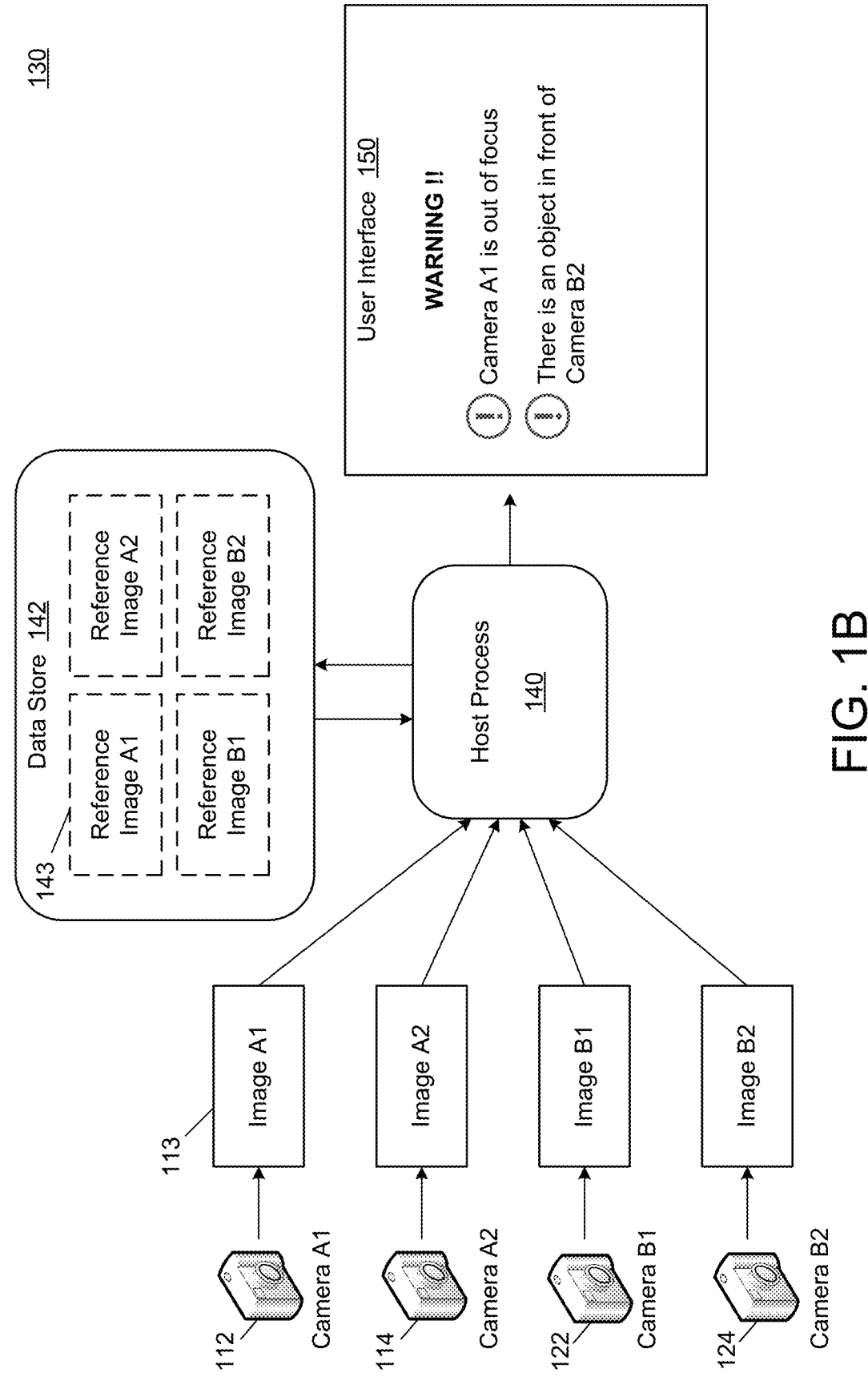
FIG. 1B is a diagram illustrating a process of monitoring the health of the cameras located on the plant floor in FIG. 1A, in accordance with an example embodiment.

FIG. 1B illustrates a process of monitoring a health of the cameras 112, 114, 122, and 124, located on the plant floor 100 in FIG. 1A, in accordance with an example embodiment. Referring to FIG. 1B, each of the cameras 112, 114, 122, and 124 may capture a respective image of their view of the plant floor 100 include any industrial asset in the field of view and provide the captured images to a host process 140. As an example, the host process may be embedded as a software program within the cameras 112, 114, 122, and 124, or it may be hosted on a remote computing system that is connected to the cameras 112, 114, 122, and 124 via a network such as the Internet.

According to various embodiments, the host process 140 may evaluate the quality of each of the cameras 112, 114, 122, and 124 using a respective reference image for the respective cameras 112, 114, 122, and 124. In particular, each camera may have its own respective reference image that is stored within a data store 142 of the host process 140. The reference images may be captured by the respective cameras and may be thought of as a default view or an expected view for a respective camera. For example, camera 112 may capture a reference image 143 of its view of the plant floor and forward the reference image 143 to the host process 140 which stores it within the data store 142. The reference image 143 may include a typical representation/view of the plant floor 100 that the camera 112 should be capturing. This reference image 143 can be compared to a new image 113 from the camera 112 to determine whether any quality attributes of the camera 112 (e.g., focus, zoom, object obstruction, pan, tilt, etc.) have degraded since the reference image was captured and needs attention.

The host process 140 may also communicate with a user interface 150 that may be located within a software application or other software program that is associated with the cameras 112, 114, 122, and 124. For example, the software application may include an analytic software application that can predict failures to the steam turbines 110 and 120 (e.g., in the future) based on images that are fed back from the cameras 112, 114, 122, and 124. For example, any cracks, rust, discoloration, burn marks, damage, or the like, may be captured by the cameras 112, 114, 122, and 124 and input to a machine learning model used by the software application to predict a future point in time when the asset will fail or will need maintenance. Thus, the host process 140 can be a proactive monitoring process 140 that monitors industrial assets for problems, but embodiments are not limited thereto.

In this example, the host process 140 determines that two of the cameras have quality issues. In particular, the camera 112 is out of focus, and the camera 124 has an object obstructing its view. Information about both of these issues may be displayed on a same user interface or on different user interfaces. For example, the warning about camera 112 may be displayed on a user interface on an exterior of the camera 112. Likewise, the warning about camera 124 may be displayed on a user interface on an exterior of camera 114. In addition, or instead, the notifications/alerts may be sent to a software application hosted on a remote computing platform and output via a software application also hosted by the remote computing platform.

Figure 2A:
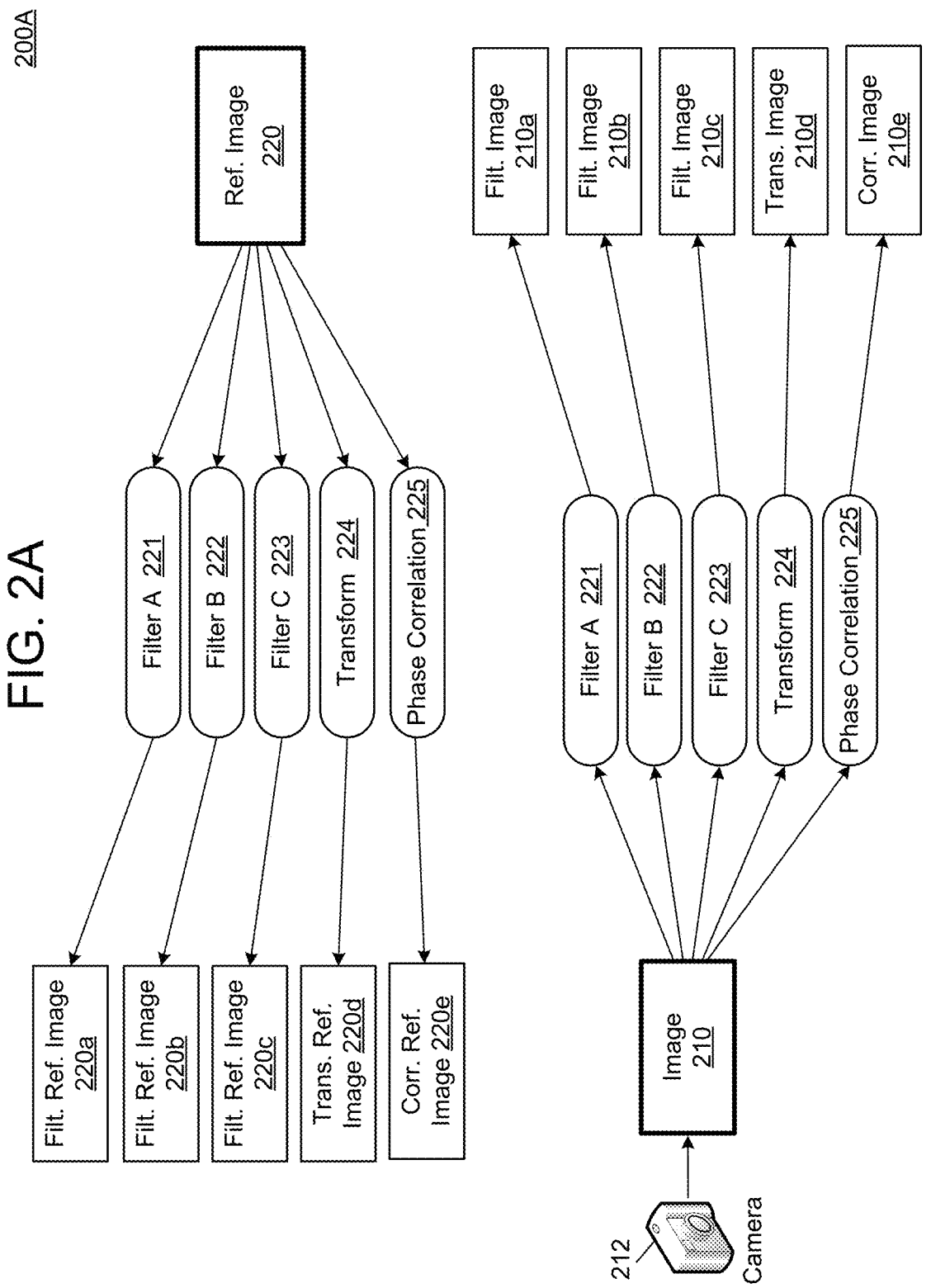

FIGS. 2A-2B illustrate a process of filtering images and comparing them to filtered reference images to identify quality values of a camera in accordance with an example embodiment. Referring to FIG. 2A, a process 200A of filtering an image 210 captured by a camera 212 and filtering a reference image 220 which represents a default view of a scene that should be captured by the camera 212. Here, the host process may apply one or more spatial filters to the image 210 and the reference image 220 to enhance the attributes within the images. For example, a Laplacian filter may be applied to the image 210 by multiplying the image 210 with the Laplacian filter. The same filtering process can also be performed for the reference image 220. The filtered images may enhance the edges and the lines within the images making it easier for analyzation and comparison.

In FIG. 2A, there are four filters 221, 222, and 223 which may be spatial filters such as Laplacian filters that can be used to isolate and enhance features of interest from the image 210 and the reference image 220. Furthermore, a phase correlation filter 225 may be used to identify edges and other attributes within the image to calculate a phase correlation, shift, etc. Each filter may correspond to a different quality attribute to be analyzed. For example, the filter 221 may be designed to enhance the blur components of the image 210 for focus analysis, the filter 222 may be designed to illuminate edges and corners for identify objects in the field of view of the camera. Furthermore, shift is identified by calculating phase cross correlation between the two images based on the phase correlation filter 225. Here, both the image 210 and the reference image may be filtered using a phase correlation filter 225 which can be used to detect camera shift, zoom, rotation, and the like.

Each of the three filters 221, 222, and 223, may be applied to the image 210 to generate a plurality of filtered images 210a, 210b, and 210c. Likewise, the transform operation 224 may be applied to the image 210 to generate a transformed image 210d. Furthermore, the phase correlation filter 225 can be applied to the image 210 to generate another filtered image 210e. The same filters 221, 222, and 223 may be applied to the reference image 220 to generate a plurality of filtered reference images 220a, 220b, and 220c. Likewise, the transform operation 224 may be applied to the reference image 220 to generate a transformed reference image 220d, and the phase correlation filter 225 can be applied to the reference image to generate another filtered reference image 220e. There is no limit on the filters and transform operations that can be applied to each of the images. It should also be appreciated that the filtering of the image 210 and the filtering of the reference image 220 may be performed at the same time (i.e., simultaneously). It should also be appreciated that the different filtering operations performed on the image 210 (and/or the reference image 220) may be performed simultaneously.

In this example, the different filters provide various benefits. For example, the Laplacian filter that is used for out of focus and image quality can be applied to both the reference image and the image to generate filtered images which highlight edges. In addition, a variance (metric) of the filtered image may be used to quantify the amount of focus. Here, more edges signify that the camera is appropriately focused and less edges means lack of focus. As another example, the correlation filter (for obstruction detection) may be used to calculate the correlation between the reference image and image, where low correlation indicates presence of obstruction or a change in scene. As another example, phase cross correlation (for shift/pan detection) can be determined by calculating the phase cross correlation between the reference image and the image. As another example, phase cross correlation with log polar transform (for zoom and rotation detection) may be used. In this example, the image and reference image are first transformed to log polar coordinates and then phase cross correlation is calculated between the transformed images to quantify zoom and rotation.

FIG. 2B illustrates a process 200B of comparing the filtered images and the filtered reference images to determine quality attributes of the camera, and displaying information about the determination via a user interface 230. Referring to FIG. 2B, a host process 240 may compare the filtered image 210a to the filtered reference image 220a, to identify whether the camera is out of focus. In this case, the filter 221 that is applied to the image 210 and the reference image 220 can help identify any blur that is present in the images. The host process 240 may also compare the filtered image 210b to the filtered reference image 220b to identify whether an object or other obstruction is in the way of the camera's field of view. The filter 222 may help illuminate edges and lines within the images which can represent objects and other items that are in the field of view of the camera. The host process 240 may also compare the filtered image 210c to the filtered reference image 220c to determine whether the zoom of the camera is incorrect or has otherwise deteriorated. In addition, the host process 240 may compare the transformed image 210d to the transformed reference image 220d to identify whether the camera has shifted. Furthermore, the host process 240 may compare the filtered image 210e to the filtered reference image 220e to quantify zoom and rotation.

The process 200B performed in FIG. 2B may be a recurring/repeating process that occurs on a predetermined frequency (e.g., once an hour, once a day, once a week, etc.) The results of the analysis may be displayed within a user interface 230. For example, the host process 240 may identify a quality value for the plurality of different quality attributes associated with the filtered images and the filtered reference images. Here, an expected quality value of a quality attribute may be a value of "3". Any score below such expected quality value is considered a score that requires an alert and possibly attention. For example, if the camera is out of focus, the score will be a "0" or a "1". If the camera does not have a focus option, the score will be a "2" which means not applicable. Here, the host process 240 can use metrics and other statistics to evaluate the filtered images and the filtered reference images to derive scores. The scores are arbitrary and used by the system for comparison purposes. However, it should also be appreciated that a different scoring and/or labeling process may be performed. For example, instead of numbers the system may output indicators such as "good", "bad", "uncertain", "not applicable", and the like. In addition, to generate discrete quality tags the algorithm can also quantify the ratio or percentage of change in quality, focus, shift, rotation and zoom.

For example, a spatial filter associated with lack of focus of the camera may be used to filter an image from the camera. The spatial filter may also be used to filter the reference image. The filtered image and the filtered reference image can be compared using various metrics which can compute a score such as a variance, etc. Filtered image highlights edges and further variance (metric) of filtered image is used to quantify the amount of focus, more edges signify that the camera is appropriately focused and less edges means lack of focus The scored images can be used to identify which image quality attributes of the camera are no longer working properly. For example, the amount of blur detected may be compared to a threshold amount of blur. If the blur detected exceeds the threshold amount, the quality value will be determined to be less than ideal (e.g., less than "3", etc.) and instead be labeled as a "1" or a "0". Again, these scores and numbers are arbitrary and other labels may be used. The same process can be repeated for each of the filtered images/reference images and the transformed images/reference images. Also, the process may be repeated on a recurring basis.

According to various embodiments, a host system may compare a single image and a single reference image to evaluate multiple quality attributes of a camera using a combination of filters and transform operations that are baked into the host system. The process is very lightweight and does not require training or machine learning.

Figure 3:
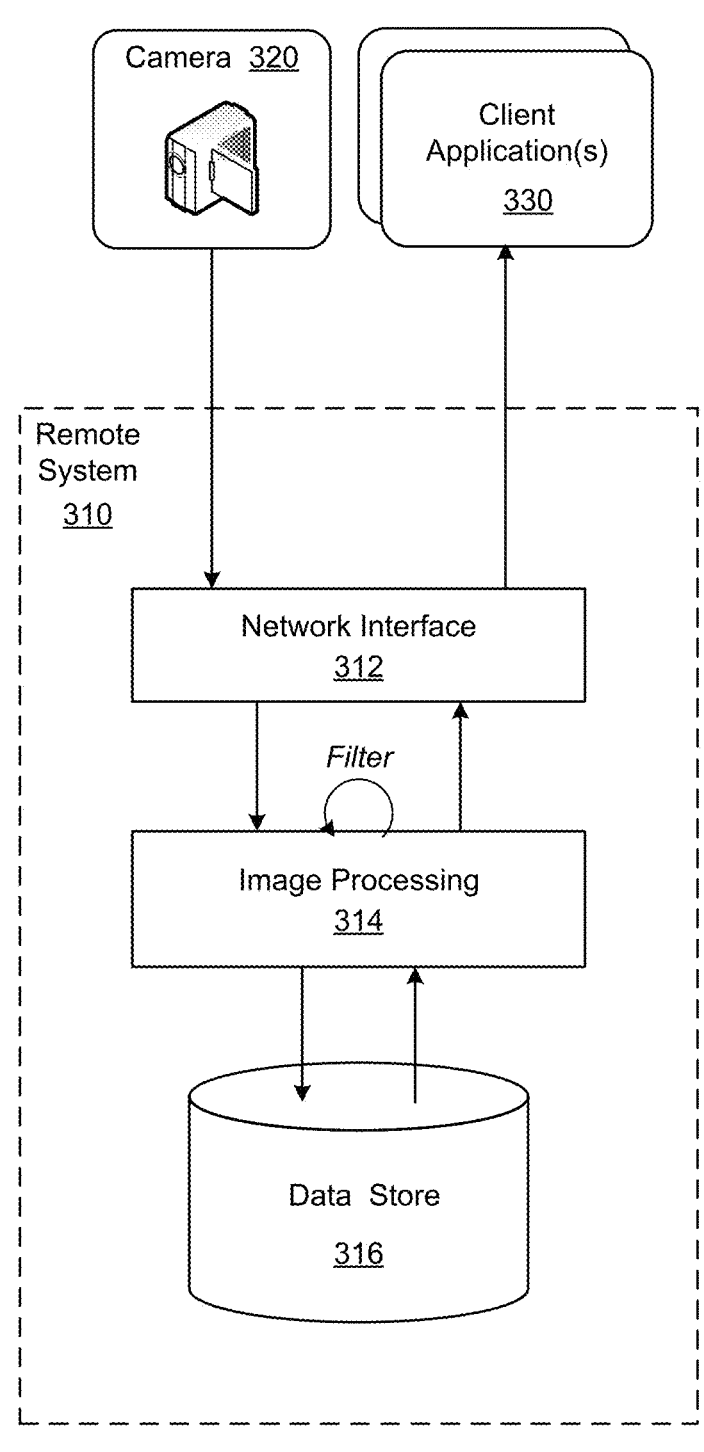
FIG. 3 is a diagram illustrating a remote computing system for monitoring the health of a camera in accordance with example embodiments.

FIG. 3 illustrates a remote computing system 310 for monitoring the health of a camera 320 and displaying alerts within an application 330 that is hosted by the remote computing system 310 in accordance with example embodiments. Referring to FIG. 3, the remote computing system 310 may be an on-premises server, a web server, a cloud platform, a database, a distributed environment, or the like. The remote computing system 310 may include a network interface 312 for network communications, and an image processing element 314 for applying filters to images and also performing transformations on images. Also, the remote computing system 310 may include a data store 316 which contains spatial filters, reference images, and the like. The camera 320 may have one or more dedicated reference images. A reference image may be an image of high quality that is previously captured by the camera 320 or another camera (not shown) of the scene that the camera is placed within. The reference image should be of good quality and can act as a point of reference for subsequent images captured by the camera 320 of the same scene.

For example, when the camera 320 captures a new image (e.g., of an industrial asset or other item in the field of view of the camera 320), the camera 320 may transmit the image to the remote computing system 310 via a computer network such as the Internet. The network interface 312 may receive the communication and forward the image to the image processor 314. The image processor 314 may access one or more spatial filters within the data store 316 and a reference image in the data store 316 and apply the one or more spatial filters to the newly received image from the camera 320 and the reference image, compare the filtered image from the camera 320 and the filtered reference image, and identify a current value of a number of quality attributes of the camera such as focus, zoom, shift, object obstruction, pan, and the like.

If an issue is detected, the host system 310 may identify which issue is the cause (or which issues) and generate an alert that can be displayed via a client application 330 that is hosted by the remote system 310 or otherwise in communication with the remote system 310. Thus, the alert can be posted immediately after the comparison of the image to the reference image via filtering.

Figure 4:
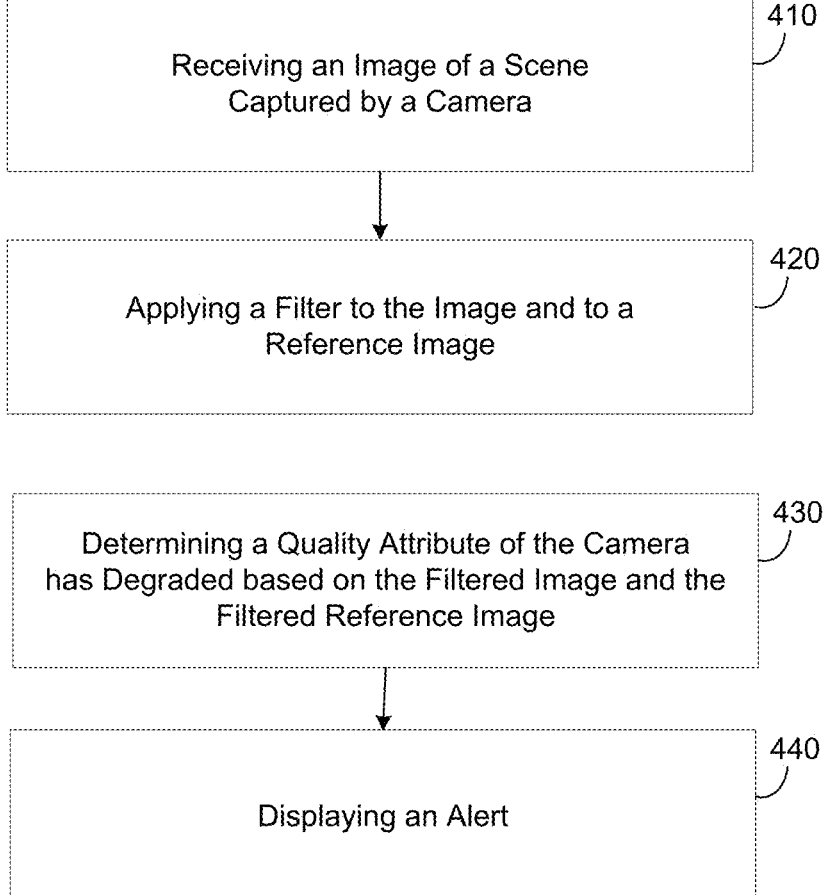
FIG. 4 is a diagram illustrating a method of detecting a change in health of a camera in accordance with an example embodiment.

FIG. 4 illustrates a method 400 of detecting a change in health of a camera in accordance with an example embodiment. For example, the method 400 may be performed by a service, an application, a program, or the like, which is executing on a host platform such as a web server, a cloud platform, an on-premises server, within the camera itself, or the like. Referring to FIG. 4, in 410, the method may include receiving an image of a scene captured by a camera. For example, the image may be received over a network at a remote server, received and stored locally by the camera itself, or the like.

In 420, the method may include applying a filter to the image corresponding to an image attribute of the camera to generate filtered image and applying the filter to a reference image of the scene to generate a filtered reference image, respectively. In 430, the method may include determining that a quality of the image attribute of the camera has degraded based on a comparison of the filtered image to the filtered reference image. In 440, the method may include displaying an alert on a user interface with information about the degradation of the quality of the image attribute. The alert may identify the camera, identify a quality attribute that has changed such as focus, obstruction, change in field of view, change in zoom, or the like, and provide a warning to a user interface.

In some embodiments, the applying may include applying a Laplacian filter to the image and the reference image, and the determining comprises identifying a degradation in image quality of the image based on a comparison of the Laplacian-filtered image and the Laplacian-filtered reference image. In some embodiments, the applying may include applying a Laplacian filter to the image and the reference image, and the determining comprises determining that the quality of the image attribute of the camera has degraded due to blur based on a comparison of the Laplacian-filtered image and the Laplacian-filtered reference image.

In some embodiments, the method may further include transforming the image and the reference image into a frequency domain, identifying one or more of a change in shift and a change in zoom of the camera based on the comparison of the transformed image and the transformed reference image, and displaying information about the identification of the one or more changes via the user interface. In some embodiments, the method may further include determining whether an object is obstructing a field of view of the camera based on a comparison of the filtered-image and the filtered reference image, and displaying information about the determination via the user interface.

In some embodiments, the method further may further include measuring a change in one or more of tilt, zoom, and pan, based on a comparison of one or more measurements of the image to one or more measurements of the reference image, and displaying an alert on the user interface with information about the measured change. In some embodiments, the receiving may include receiving the image via a cloud platform, and the displaying comprises displaying the alert on a user interface of a software application hosted on the cloud platform in association with the camera. In some embodiments, the applying may include simultaneously applying a plurality of different filters to the image and the reference image to generated a plurality of filtered images and a plurality of filtered reference images, and comparing the plurality of filtered images to the plurality of filtered references images to identify a plurality of quality attributes of the camera.

Figure 5:
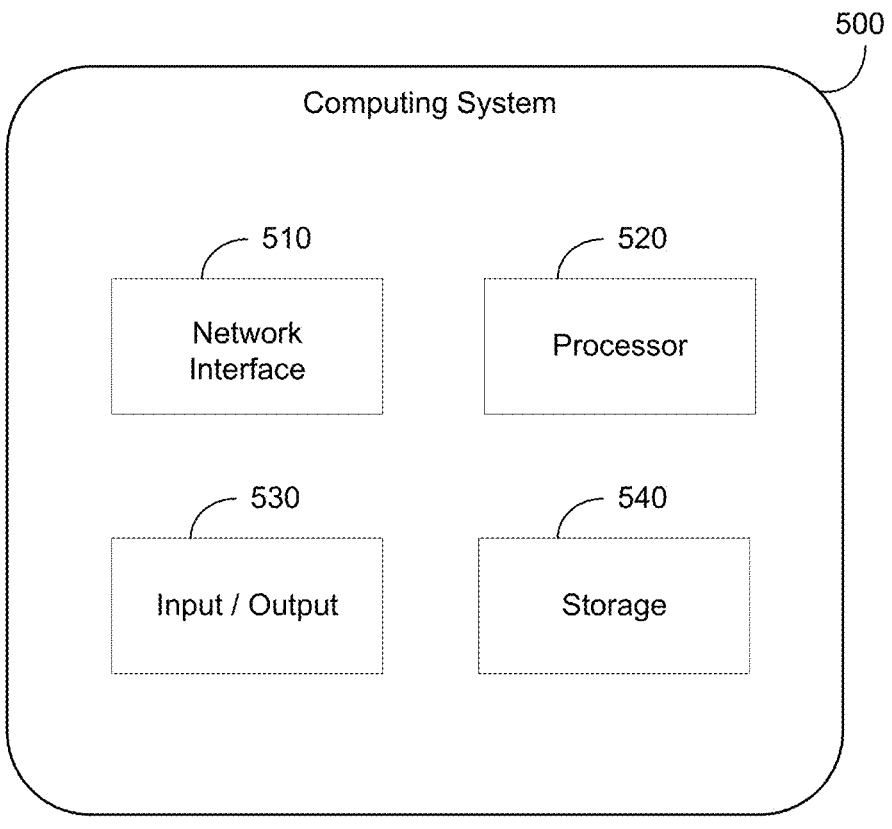
FIG. 5 is a diagram illustrating a computing system that may be used in any of the methods and processes described herein, in accordance with an example embodiment.

FIG. 5 illustrates a computing system 500 that may be used in any of the methods and processes described herein, in accordance with an example embodiment. For example, the computing system 500 may be a database node, a server, a cloud platform, a user device, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store having a plurality of tables, partitions and sub-partitions. The storage 540 may be used to store database objects, records, items, entries, and the like, associated with workflow/process analysis and optimization.

According to various embodiments, the storage 540 may store an image of a scene captured by a camera. The camera may capture multiple images of the same scene on a recurring basis (e.g., every minute, every hour, every day, etc.) and store the image in a local memory thereof or feed the image to a cloud platform where it is stored. The processor 520 may apply a filter to the image corresponding to an image attribute of the camera to generate filtered image and apply the filter to a reference image of the scene to generate a filtered reference image, respectively. The processor 520 may determine that a quality of the image attribute of the camera has degraded based on a comparison of the filtered image to the filtered reference image. The processor 520 may display an alert on a user interface with information about the degradation of the quality of the image attribute.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising: a storage configured to store a single image of a scene captured by a camera; and a processor configured to simultaneously apply a plurality of different filters to the single image, each filter corresponding to an image attribute of the camera to generate a plurality of filtered images and simultaneously apply the plurality of different filters to a single reference image of the scene to generate a plurality of filtered reference images, respectively, wherein application of different filters to the image and the reference image is simultaneous, compare the plurality of filtered images to the plurality of filtered reference images to identify a plurality of quality attributes of the camera, determine that at least one quality attribute of the camera has degraded based on the comparison, and display an alert on a user interface with information about the degradation of the quality of the image attribute.

2. The computing system of claim 1, wherein the processor is configured to apply a Laplacian filter to the image and the reference image, and identify a degradation in quality of the image based on a comparison of the Laplacian-filtered image and the Laplacian-filtered reference image.

3. The computing system of claim 1, wherein the processor is configured to apply a Laplacian filter to the image and the reference image, and determine that the quality of the image attribute of the camera has degraded due to blur based on a comparison of the Laplacian-filtered image and the Laplacian-filtered reference image.

4. The computing system of claim 1, wherein the processor is configured to transform the image and the reference image into a frequency domain, identify one or more of a change in shift and a change in zoom of the camera based on the comparison of the transformed image and the transformed reference image, and display information about the identification of the one or more changes via the user interface.

5. The computing system of claim 1, wherein the processor is further configured to determine whether an object is obstructing a field of view of the camera based on a comparison of the filtered-image and the filtered reference image, and display information about the determination via the user interface.

6. The computing system of claim 1, wherein the processor is further configured to measure a change in one or more of tilt, zoom, and pan, based on a comparison of one or more measurements of the image to one or more measurements of the reference image, and display an alert on the user interface with information about the measured change.

7. The computing system of claim 1, further comprises a network interface configured to receive the image via a cloud platform, wherein the processor is configured to display the alert on a user interface of a software application hosted on the cloud platform in association with the camera.

8. The computing system of claim 1, wherein the processor is further configured to determine a change in metrics of one or more of quality, focus, shift, zoom, and rotation.

9. A method comprising: receiving a single image of a scene captured by a camera;
  simultaneously applying a plurality of different filters to the single image, each filter corresponding to an image attribute of the camera to generate a plurality of filtered images and simultaneously applying the plurality of different filters to a single reference image of the scene to generate a plurality of filtered reference images, respectively, wherein application of different filters to the image and the reference image is simultaneous,
  comparing the plurality of filtered images to the plurality of filtered reference images to identify a plurality of quality attributes of the camera, determining that at least one quality attribute of the camera has degraded based on the comparison, and
  displaying an alert on a user interface with information about the degradation of the quality of the image attribute.

10. The method of claim 9, wherein the applying comprises applying a Laplacian filter to the image and the reference image, and the determining comprises identifying a degradation in quality of the image based on a comparison of the Laplacian-filtered image and the Laplacian-filtered reference image.

11. The method of claim 9, wherein the applying comprises applying a Laplacian filter to the image and the reference image, and the determining comprises determining that the quality of the image attribute of the camera has degraded due to blur based on a comparison of the Laplacian-filtered image and the Laplacian-filtered reference image.

12. The method of claim 9, wherein the method further comprises transforming the image and the reference image into a frequency domain, identifying one or more of a change in shift and a change in zoom of the camera based on the comparison of the transformed image and the transformed reference image, and displaying information about the identification of the one or more changes via the user interface.

13. The method of claim 9, wherein the method further comprises determining whether an object is obstructing a field of view of the camera based on a comparison of the filtered-image and the filtered reference image, and displaying information about the determination via the user interface.

14. The method of claim 9, wherein the method further comprises measuring a change in one or more of tilt, zoom, and pan, based on a comparison of one or more measurements of the image to one or more measurements of the reference image, and displaying an alert on the user interface with information about the measured change.

15. The method of claim 9, wherein the receiving comprises receiving the image via a cloud platform, and the displaying comprises displaying the alert on a user interface of a software application hosted on the cloud platform in association with the camera.

16. A non-transitory computer-readable medium comprising instructions which when executed by a processor cause a computer to perform a method comprising:
  receiving a single image of a scene captured by a camera;
  simultaneously applying a plurality of different filters to the single image, each filter corresponding to an image attribute of the camera to generate a plurality of filtered images and simultaneously applying the plurality of different filters to a single reference image of the scene to generate a plurality of filtered reference images, respectively, wherein application of different filters to the image and the reference image is simultaneous,
  comparing the plurality of filtered images to the plurality of filtered reference images to identify a plurality of quality attributes of the camera,
  determining that at least one quality attribute of the camera has degraded based on the comparison,
  and displaying an alert on a user interface with information about the degradation of the quality of the image attribute.

17. The non-transitory computer-readable medium of claim 16, wherein the applying comprises applying a Laplacian filter to the image and the reference image, and the determining comprises identifying a degradation in quality of the image based on a comparison of the Laplacian-filtered image and the Laplacian-filtered reference image.

18. The non-transitory computer-readable medium of claim 16, wherein the applying comprises applying a Laplacian filter to the image and the reference image, and the determining comprises determining that the quality of the image attribute of the camera has degraded due to blur based on a comparison of the Laplacian-filtered image and the Laplacian-filtered reference image.

* * * * *